Patented July 29, 1941

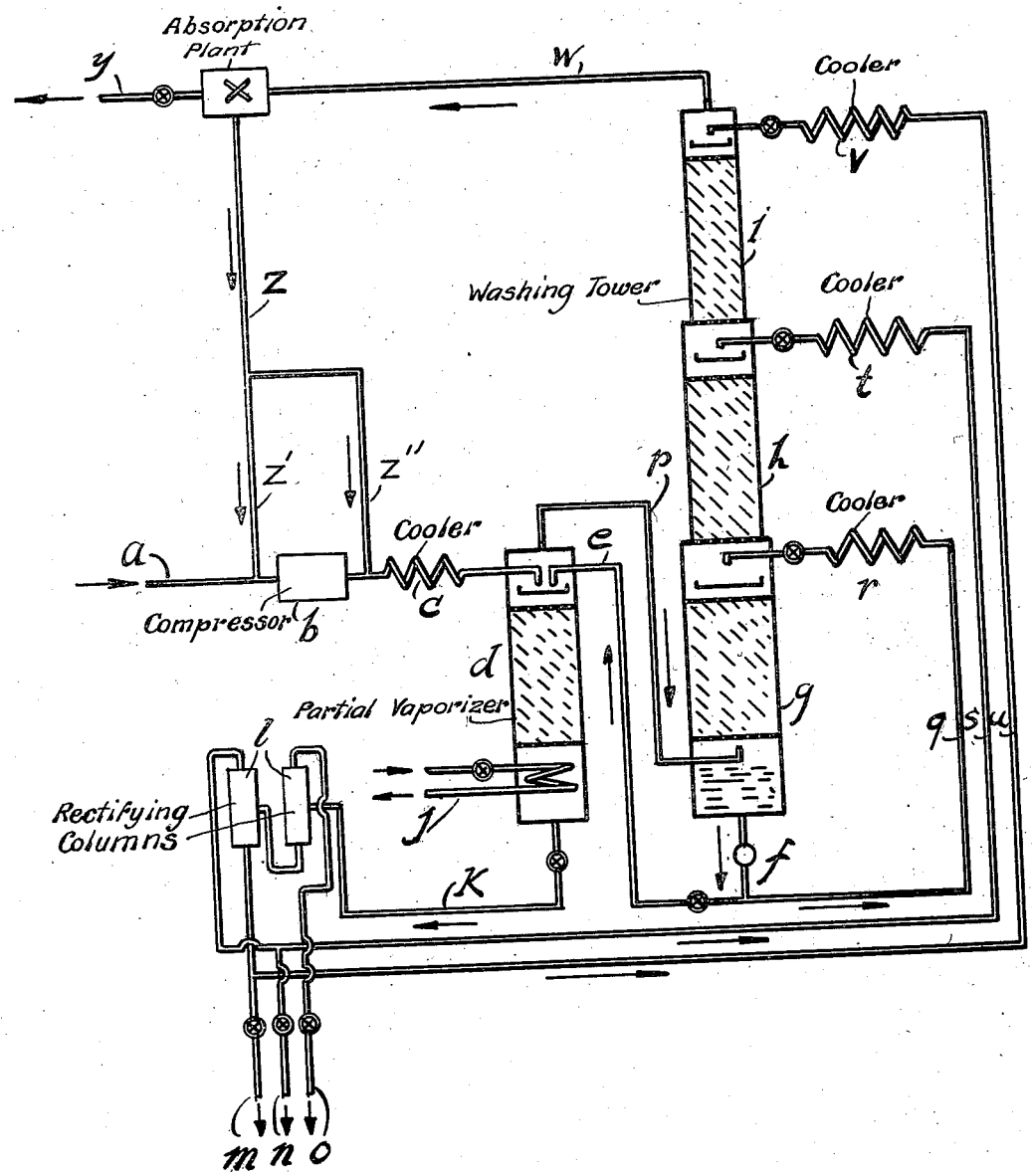

2,250,949

UNITED STATES PATENT OFFICE 2,250,949

PROCESS FOR THE SEPARATION OF HYDROCARBONS FROM GASES CONTAINING THEM

Richard Gerlach, Leuna, Germany, assignor, by mesne assignments, to William E. Currie, New York, N. Y.

Application December 10, 1937, Serial No. 179,037
In Germany December 12, 1936

9 Claims. (Cl. 62—175.5)

The present invention relates to a process for separating hydrocarbons from gases containing them.

It is known that hydrocarbons may be separated from gases containing them by compressing the gas mixture, cooling it to form a condensate, separating uncondensed gases from the condensate and washing out the hydrocarbons still contained in the uncondensed gas. If the gas mixture contains large amounts of so-called permanent gases, as, for example, hydrogen, carbon monoxide, nitrogen and methane, and if it is desired to absorb ethane as well as propane, butane, etc. from the gas mixture, difficulties are encountered in the absorption treatment because large amounts of oil are necessary and considerable amounts of permanent gases are thus also dissolved. If the compressed gas mixture is fractionated by cooling and rectification alone, three columns are necessary for the separate recovery of ethane, propane and butane; butane remains as the bottom product in the first column, propane in the second and ethane in the third. This manner of working also has the drawback that it requires considerable cooling because the temperature must be reduced to about —100° C. at the pressure of about 20 atmospheres generally used for such rectification processes. Quite apart from the high cost of cooling to such low temperatures, there is also the danger that troublesome deposits of ice may be formed.

I have now found that the said drawbacks are avoided when the gas mixture is led, after compression, cooling and the separation of any condensate thus formed, into a washing tower having its superposed parts charged with liquefied hydrocarbons separated from the gas mixture in such manner that the lowermost part of the washing tower is supplied with the hydrocarbon, having the second lowest boiling point, as washing agent, the next higher part of the tower with the hydrocarbon having the next higher boiling point and so on and the uppermost part is supplied with the highest boiling of the said hydrocarbons.

Each hydrocarbon serves especially for the washing out of the hydrocarbon next lowest in boiling point for which it has a specially good solvent power, so that only relatively small amounts of washing agent are necessary.

In the washing tower the hydrocarbons to be separated are absorbed while the permanent gases leave together with small amounts of the washing agent used in the uppermost part of the washing tower from which they may be freed in a simple manner by washing with oil or with the aid of active carbon.

The washing agent and the hydrocarbons absorbed therein, which are removed from the lower end of the washing tower, may be separated in a simple manner in a rectifying apparatus. Since the mixture to be fractionated is practically free from permanent gases, two columns are sufficient for the separation of ethane, propane and butane. With a pressure for example of from 20 to 26 atmospheres, a lowering of temperature to from 0° to 10° C. is sufficient so that there is no danger of stoppage by ice. If desired, after the separation of ethane, only part of the propane-butane-mixture is further fractionated while the other part is used again for washing out ethane.

The nature of the invention will be further described with reference to the accompanying drawing in which is shown diagrammatically an arrangement of apparatus suitable for carrying out the process according to this invention but the invention is not restricted to the particular arrangement shown.

The gas mixture to be fractionated, which enters through a pipe $a$, is compressed in a compressor $b$ and cooled in a cooler $c$. The condensate thus deposited is separated in $d$ from non-condensed gas and the latter is led through a pipe $p$ into the washing tower consisting of parts $h$ and $i$ or if desired into a washing vessel $g$ which may be introduced beneath the washing tower for the purpose of removing the heat of absorption formed during the washing.

The washing vessel $g$ is charged with the aid of a pump $f$ through a pipe $q$ with a part of the liquid separated at the bottom of the vessel $g$ after cooling in $r$. The amount of liquid to be led in the cycle and the degree of cooling depend on the amount of the heat of absorption to be removed.

The removal of the heat of absorption may also be effected by intermediate cooling of the solution trickling down in the washing tower in or outside the washing tower.

The gas mixture leaving $g$ is washed in the lower part $h$ of the washing tower. As washing agent there serves, in addition to the solution coming from the part $i$, the second-lowest boiling of the hydrocarbons to be dissolved. The residual gas is finally washed in the part $i$ with the highest-boiling of the hydrocarbons to be dissolved and then flows into an absorption plant $x$ in which it is freed from vapors of the highest-boiling washing agent by washing with oil or by treatment with active carbon. The impure hydrocarbon thus obtained may be added to the initial gas through the pipes $z$ and $z'$ or $z''$.

The washing agents supplied at the various parts of the washing tower which contain the absorbed hydrocarbons collect in the lower part of the washing tower or in the washing vessel $g$ and, insofar as they are not returned to $g$ in a cycle, are led through a pipe $e$ into a partial vaporizer $d$ in which they are heated together with the condensate obtained from the initial gas by compression and cooling with the aid of a heating coil $j$ in order to expel undesirable gases dissolved therein, as for example methane. The gases or vapors thus expelled are supplied to the washing tower or washing vessel $g$ together with the noncondensed initial gases.

The hydrocarbon mixture leaving the partial vaporizer $d$ in a liquid state is supplied through a pipe $k$ to a separating plant $l$ which may consist for example of two rectifying columns. A part of the hydrocarbons thus obtained flows through pipes $s$ or $u$ and through coolers $t$ or $v$ to the parts $h$ or $i$ of the washing tower for use as washing agent.

The following example will further illustrate the nature of this invention but the invention is not restricted to this example.

*Example*

3000 cubic meters per hour of a gas mixture consisting of 37.4 per cent of methane, 32.6 per cent of ethane, 23.9 per cent of propane and 6.1 per cent of butane are caused to flow through the pipe $a$ into the compressor $b$ in which they are compressed to 21 atmospheres, and thence into the cooler $c$ in which at 25° C. there occurs a separation of 13.7 per cent by volume of the gas as a condensate. This condensate is warmed in the partial vaporizer $d$ together with the hydrocarbon mixture supplied from the washing vessel $g$ through the pump $f$ and the pipe $e$ in an amount of 11610 kilograms per hour and consisting in the gaseous state of 2.7 per cent of methane, 17.0 per cent of ethane, 43.7 per cent of propane and 36.6 per cent of butane. In this way 6.5 per cent by volume of the mixture brought into the partial vaporizer are vaporized again. Through the pipe $k$ there flow per hour 11959 kilograms of liquid product which, in the gaseous state, consists of 15.8 per cent of ethane, 45.3 per cent of propane and 38.9 per cent of butane, and pass into the rectifying columns of the separating plant $l$. In the latter there are obtained per hour 1204 kilograms of ethane, 5047 kilograms of propane and 5708 kilograms of butane. Of these, 3755 kilograms of propane and 5276 kilograms of butane are led through the pipes $s$ and $u$ respectively, after cooling in $t$ and $v$ to 10° C., into the parts $h$ and $i$ respectively of the washing tower per hour.

If desired, the hydrocarbon mixture also can be divided into 1204 kilograms of ethane, 1292 kilograms of propane, 1461 kilograms of butane and 8002 kilograms of a propane-butane mixture consisting of 46.9 per cent by weight of propane and 53.1 per cent of butane. 1029 kilograms of butane flow through the pipe $u$ into the part $i$ and the propane-butane mixture through the pipe $s$ into the part $h$ of the washing tower.

In both cases at $o$, $n$ and $m$ respectively there are obtained per hour 1204 kilograms of ethane, 1292 kilograms of propane and 432 kilograms of butane.

The gas not condensed in the cooler $c$ and the vapors expelled from the solution in the partial vaporizer $d$, together amounting to 3107 cubic meters per hour and containing 41.9 per cent of methane, 33.9 per cent of ethane, 19.9 per cent of propane and 4.3 per cent of butane, flow through the pipe $p$ into the washing vessel $g$. From the latter there are withdrawn per hour 17.1 cubic meters of solution which are returned in a cycle with the aid of the pump $f$ through the pipe $q$ after a cooling in $r$ from 25° to 10° C., whereby 78300 heat units per hour are removed.

The 1223 cubic meters of gas per hour containing 92.7 per cent of methane and 7.3 per cent of butane which leave the upper part $i$ of the washing tower are split up in the oil washer $x$ by treatment with 1.8 cubic meters per hour of washing oil having an average molecular weight of 235 and a specific gravity of 0.850 at 15° C. into 1122 cubic meters of practically pure methane which is led away at $y$ and 101 cubic meters of impure butane which is incorporated with the initial gas through the pipes $z$ and $z'$.

What I claim is:

1. A method of separating hydrocarbons from gases containing permanent gases in addition to the hydrocarbons which comprises compressing and cooling the mixed gases, separating the condensate thus formed into a plurality of liquid constituents of different boiling points, introducing the uncondensed gases into the lower portion of a washing tower composed of superposed parts, supplying the said liquid constituents as washing agents to said tower at different points throughout its height, the liquid having the highest boiling point being supplied at the top and successively lower boiling point liquids being supplied at successively lower levels, withdrawing the resulting mixture of washing agents and absorbed constituents from the bottom of the tower.

2. In the process as claimed in claim 1 the further step of adding the said withdrawn mixture of washing agents and absorbed constituents to said original condensate prior to the said step of separating it into a plurality of liquid constituents of different boiling points.

3. In the process as claimed in claim 1 the step of passing the said withdrawn mixture of washing agents and absorbed constituents into a washing vessel positioned beneath the said tower, passing the said uncondensed gases into said washing vessel and into contact with the liquid mixture therein prior to passing the said uncondensed gases into said tower, withdrawing the resulting liquids from said washing vessel, cooling a part of the withdrawn liquids and returning the cooled part to said washing vessel in order to remove the heat of absorption.

4. In the process as claimed in claim 1 the step of expelling undesirable gases dissolved in the said mixture of washing agents and absorbed constituents from this mixture, then fractionating this mixture into a plurality of liquid constituents of different boiling points and using these in the said step of supplying the said liquid constituents to said tower at different points throughout its height, and reintroducing said undesirable gases into the washing tower together with the said uncondensed initial gases.

5. The process as claimed in claim 1 which comprises introducing the said uncondensed gases into a washing vessel positioned beneath the said washing tower and in which the washing agents and the absorbed hydrocarbons flowing from the washing tower collect, withdrawing this solution from said washing vessel, cooling a part of it and returning the cooled solution to said washing vessel, adding the other part of said solution to said condensate obtained from the initial gases by compression and cooling, expelling from the resulting mixture the undesirable gases dissolved therein, fractionating said mixture into a plurality of liquid constituents of different boiling points, using the fractions as the said washing agents in said tower and reintroducing the undesirable gases into said washing vessel together with the non-condensed initial gases.

6. In the process as claimed in claim 1 the step of expelling undesirable gases dissolved in the mixture of washing agents and absorbed hydrocarbons collected in the lowest part of the washing apparatus from this mixture and reintroducing said undesirable gases into the washing tower together with the noncondensed initial gases.

7. In the process as claimed in claim 1 the step of expelling undesirable gases from the mixture of washing agents and absorbed hydrocarbons collected in the lowest part of the washing apparatus and from the condensate obtained from the initial gases by compression and cooling and reintroducing the undesirable gases into the washing tower together with the non-condensed initial gases.

8. The process as claimed in claim 1 which comprises introducing the initial gases after compression, cooling and the separation of any condensate thus formed into a washing vessel positioned beneath the washing tower in which the washing agents and the absorbed hydrocarbons flowing from the washing tower collect, withdrawing this solution, cooling a part of it and returning the cooled solution to the washing vessel, and expelling from the other part of this solution and also from the condensate obtained from the initial gases by compression and cooling the undesirable gases dissolved therein, and reintroducing said undesirable gases into the washing vessel together with the non-condensed initial gases.

9. In the process as claimed in claim 1 the further step of separating from the gases leaving the washing tower, the portion of the highest boiling of the hydrocarbons to be separated which is still contained therein, in a known manner, and adding said portion to the initial gases.

RICHARD GERLACH.